(12) United States Patent
Mincher et al.

(10) Patent No.: US 8,915,445 B1
(45) Date of Patent: Dec. 23, 2014

(54) ACTIVATING DEVICE USING CONTACTING MOTION SENSOR

(71) Applicant: Amazon Technologies, Inc., Reno, NV (US)

(72) Inventors: Richard William Mincher, Cupertino, CA (US); David George Butler, San Jose, CA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/029,393

(22) Filed: Sep. 17, 2013

(51) Int. Cl.
G06K 7/10 (2006.01)
G06K 7/016 (2006.01)

(52) U.S. Cl.
CPC ............ *G06K 7/016* (2013.01); *G06K 7/10821* (2013.01)
USPC ........................................................ 235/470

(58) Field of Classification Search
USPC .................. 235/445, 454, 462.01–472.03
See application file for complete search history.

(56) References Cited

U.S. PATENT DOCUMENTS

| | | | |
|---|---|---|---|
| 5,656,804 A * | 8/1997 | Barkan et al. | 235/472.01 |
| 6,021,947 A * | 2/2000 | Swartz | 235/472.01 |
| 6,070,476 A * | 6/2000 | Shine et al. | 73/864.81 |
| 6,089,943 A * | 7/2000 | Lo | 446/175 |
| 6,627,870 B1 * | 9/2003 | Lapstun et al. | 250/221 |
| 7,659,891 B2 * | 2/2010 | Mackenzie | 345/179 |
| 2007/0138287 A1 * | 6/2007 | Lombardi | 235/462.13 |
| 2010/0128468 A1 * | 5/2010 | Ong et al. | 362/106 |
| 2011/0038038 A1 * | 2/2011 | Kamm et al. | 359/362 |
| 2011/0290889 A1 * | 12/2011 | Tamburrini et al. | 235/470 |
| 2013/0237280 A1 * | 9/2013 | Tsau et al. | 455/556.1 |

* cited by examiner

*Primary Examiner* — Tuyen K Vo
(74) *Attorney, Agent, or Firm* — Lindauer Law, PLLC

(57) ABSTRACT

A signal is provided in response to moving contact of a device with an object. Electronic circuitry transitions from an inactive state to an active state in response to the signal and scans a machine-readable code borne by the object. A data signal including or encoding the machine-readable code is provided. The electronic circuitry may transition from the active state back to the inactive state after the data signal has been provided and the present code scanning operation is complete. Power consumption by code scanner devices, user input stylus, or other apparatus is reduced accordingly.

20 Claims, 10 Drawing Sheets

ACTIVATING DEVICE USING CONTACTING MOTION SENSOR

BACKGROUND

Code scanners and readers are used to read optical barcodes, radio frequency identification (RFID) tags, and so forth, in numerous areas of endeavor. Many such code scanners are built as portable, battery-powered devices. Users seek to reduce energy consumption and extend battery life with respect to various code scanners and other devices.

Figure 1:
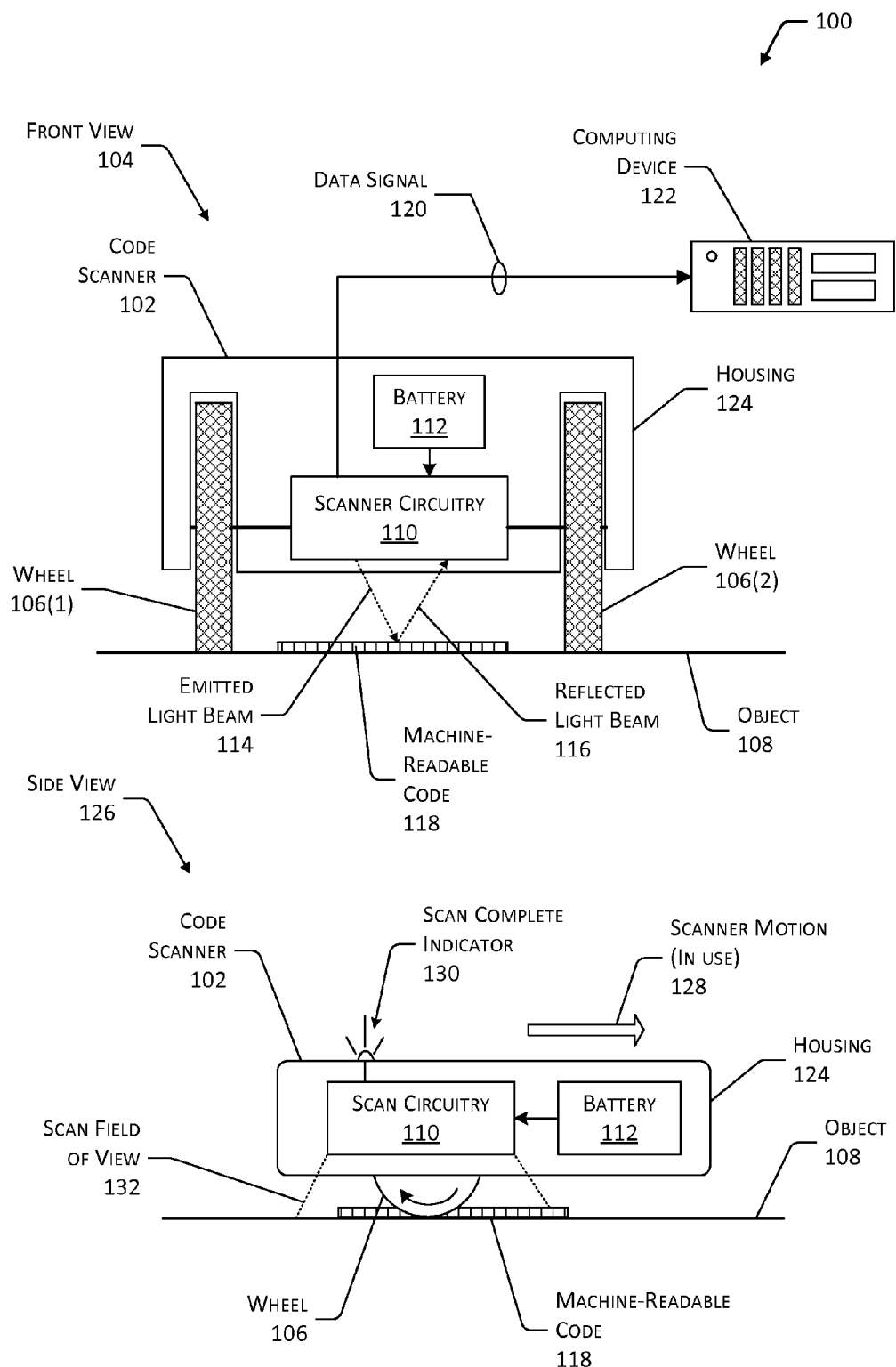
FIG. 1 illustrates one implementation of a code scanner configured to use motion of a wheel in contact with an object to activate a scan.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

Code scanners are devices used for reading machine-readable codes borne by various objects. Many such devices are designed with handheld, portable form-factors and operate by way of rechargeable or disposable batteries. Additionally, numerous multi-purpose devices such as tablet computers, smart phones, and so on are equipped or resourced to read different types of machine-readable code. For example, an application (i.e., program software) may enable a smartphone to read a two-dimensional optical code presented by an advertising display, by way of a camera of the smartphone.

In one instance, a device reads barcodes or other visibly encoded information using light energy emitted from the device, wherein a portion of that light is reflected off of the barcode or other encoded image. Generally, a contrasting light-and-dark pattern of the reflected light conveys the specific value of the barcode, which is received by a detector or sensor of the device. A controller or other resource interprets an electrical signal from the detector and derives the underlying encoded value or information. Thus, the barcode is "illuminated" by one or more light emitters powered by the code scanner device. However, in some implementations ambient light may be used and the code scanner device may omit the one or more light emitters.

In another instance, a device reads information encoded by a non-optical tag such as a radio-frequency identification (RFID) tag, near-field communication (NFC) tag, and so forth. The device emits a radio-frequency (RF) energy field proximate to the RFID tag, which communicates the encoded information back to the device by way of a modulated, reflected portion of the RF energy, known as "backscatter". A controller or other resource interprets a scan signal from an RF detector and determines the underlying encoded value. Therefore, the RFID tag is illuminated by an energy field powered by the code scanner device. Other implementations and operating techniques may also be used.

Battery life is a concern of users that employ portable devices to scan machine-readable codes borne by various objects. In several cases, the code scanner device itself must emit light, an RF field, acoustic waves, or another energy type in order to acquire the encoded information. Additionally, electronic circuitry of the code scanner requires electrical power in order to interpret the reflected or modulated portion of the emitted energy, provide a corresponding data signal, and so forth. For example, a camera used to scan an optical machine-readable code may draw power.

Extending operation time using power stored in an onboard battery is desirable for many devices. Reducing energy consumption within code scanners, or the scanning resources of multi-purpose devices provides several benefits. These benefits may include improved user experience by increasing overall operating time between recharging sessions, enabling operation of devices which do not require recharging during their planned operational lifespan, increasing power available for other components, and so forth.

A code scanner includes a motion sensor that makes physical contact with an object bearing a machine-readable code or information. The motion sensor provides an electrical signal in response to relative motion between the code scanner and the object, which is in contact with the motion sensor. The electrical signal causes the electronic circuitry of the code scanner to switch from an inactive state to an active, operating state. Relative to the operating state, electrical power consumption of the electronic circuitry is low when in the inactive state which conserves battery-based energy resources.

The electronic circuitry then sends a signal to detecting or scanning resources, such as a light emitter and sensor pair, an RF energy field generator, an acoustic wave generator, or another suitable resource so as to begin operating. The resource(s) provides a scan signal based on the detection of the machine-readable code borne by the object. A controller, processor, or other elements of the electronic circuitry interprets or processes the scan signal and provides a data signal that includes or encodes information corresponding to the machine-readable code borne by the object. Once the code scanning and data signal provisioning are complete, the electronic circuitry (or a majority portion thereof) resumes the inactive state so as to conserve electrical power.

In one non-limiting example, a barcode scanner is in the form of a handheld casing and is powered by a rechargeable battery. Respective rotatable wheels are disposed on either side of a light emitter and detector pair. A user holds the scanner with the wheels in contact with the surface of a merchandise item (i.e., object) bearing a barcode, and moves the scanner relative thereto such that the wheels roll across the item surface. The rotating wheels cause respective direct current motors, acting as generators, to produce electrical voltages. The electrical voltages are provided to a controller of the scanner as activation signals. The controller responds to the activation signals by signaling other electronic circuitry and resources into an energized, active operating state.

In turn, the light emitter produces a light beam that is incident upon the barcode of the merchandise item as the scanner passes by. The detector detects reflected light from the barcode, and provides a corresponding scan signal to the controller. The controller interprets the scan signal and produces a digitally encoded data signal including the barcode value. Once this data signal had been provided, the controller signals the scanning circuitry to resume the inactive state until the next scanning operation is called for by way of rolling contact of the wheels with another object to be scanned.

In another non-limiting example, an RFID scanner is provided as an accessory for, and is powered by the battery of, a tablet computer. An electromechanical switch includes a member portion that extends outward away from the scanner. The member portion is spring-biased to assume a resting position when not being displaced by contact with another object. A user holds the scanner with the member in contact with the surface of an object bearing an RFID tag, and moves the scanner relative thereto such that the member is displaced (toggled, or thrown) away from the resting position. The switch, by virtue of the displaced member, provides an electrical activation signal to a controller of the RFID scanner. The controller responds to the activation signal by driving other circuitry or resources into an active operating state.

Next, an RF field emitter is energized so as to illuminate the RFID tag borne by the object. An RF sensor detects an RF signal modulated in accordance with the encoded information of the RFID tag. The RF sensor provides a corresponding scan signal to the controller, which decodes the scan signal and produces a data signal including the decoded information. Once this data signal had been provided, the controller signals the scanner circuitry to resume a de-energized, inactive state, until another scanning operation is triggered by the electromechanical switch.

Optical barcodes, RFID tags, surface acoustic wave (SAW) devices, and other machine-readable encoding techniques may be scanned and read as required by a user, while conserving battery power during inactive periods. Additionally, RF noise or interference, unnecessary energy emissions, and other concerns may be addressed, accordingly. Rotatable devices such as wheels, optically encoded wheels, wheels having electrically detectable features, spheres, spheroids, or other suitable constituents may be used as elements of respectively varying motion sensors. Respective variations on the foregoing may also be used in accordance with the methods, devices and systems described herein.

FIG. 1 depicts views 100 including a code scanner 102 and related elements. The views 100 include particular elements and operations performed by each. The views 100 are illustrative and non-limiting in nature, and other elements, devices, systems or respective operations are also contemplated.

A code scanner 102 is depicted in a front view 104, and includes respective wheels 106(1) and 106(2). The wheels 106(1) and 106(2) are mechanically configured to rotate during rolling contact with an object 108. The code scanner 102 also includes scanner circuitry 110. The scanner circuitry 110 is configured to be activated in response to a rolling motion (rotation) of either of the wheels 106(1) or 106(2), or both. That is, the scanner circuitry 110 is signaled or triggered to switch from an inactive state to an active state in response to moving the scanner 102 with the wheels 106(1) and 106(2) in rolling contact with the object 108. Thus, the wheels 106(1)-106(2) are respective portions of a motion sensor of the code scanner 102.

The scanner circuitry 110 is configured to operate by way of electrical power provided by a battery 112. The scanner circuitry 110 is also configured to consume less electrical energy while in the inactive state, relative to the active state. Thus, the electrical power drawn from the battery 112 is reduced during an inactive status of the scanner circuitry 110.

The scanner circuitry 110 is also configured to emit a light beam 114 and to detect a reflected light beam 116 when the scanner circuitry 110 is operating in the active state. The scanner circuitry 110 is further configured to interpret, or process, light-and-dark signal content within the reflected light beam 116 so as to decode a machine-readable code 118 borne by the object 108. For instance, the machine-readable code 118 may be a barcode, a two-dimensional optical code, or another form of optically (visually) encoded image. Other scanning techniques are also contemplated as described below.

The scanner circuitry 110 is configured to provide a data signal 120 that includes, or encodes, the machine-readable code 118 or information including or corresponding thereto. For example, if the machine-readable code 118 is an optically-readable universal product code (UPC), then the data signal 120 may be modulated or encoded to communicate the corresponding UPC code number. As depicted, the data signal 120 may be communicated to a computing device 122 such as a laptop or desktop computer, a server, or another suitable entity. The machine-readable code 118 may therefore be communicated by way of the data signal 120 for use in object 108 tracking, identification, authentication, inventory control, or another suitable purpose.

In another implementation, the battery 112 may be omitted, and the scanner circuitry 110 may draw operating power from the computing device 122 by way of wired connection thereto. Other power provisioning methods may also be used. In yet another implementation, a processor, a network communications circuit, or other potential resources of the computing device 122 are included within the code scanner 102. The computing device 122 may therefore be omitted in such an implementation.

The code scanner 102 further includes a housing 124 disposed about and supportive of the scanner circuitry 110 and the battery 112. The wheels 106(1) and 106(2) extend outward from the housing 124 so as to make rotatable contact with the object 108. The housing 124 may be defined by any suitable shape or form-factor, such as that of a handheld wand or "pistol".

The code scanner 102 is also depicted in a side view 126. During illustrative operation, a user places the code scanner 102 in contact with the object 108 over the machine-readable code 118 to be scanned. The code scanner 102 is then moved as indicated by the arrow 128 such that the wheels 106(1) and 106(2) roll across the surface of the object 108. The rotating motion of the wheels 106(1) and 106(2) causes an activation signal to be provided to the scanner circuitry 110, which responds by switching from an inactive state to an active state.

The scanner circuitry 110 energizes or drives the light emitter to emit the light beam 114 and illuminate the machine-readable code 118 as the code scanner 102 is being moved. The reflected light beam 116 is received by a detector of the scanner circuitry 110, which provides a corresponding scan signal. A controller, processor, or other resource of the scanner circuitry 110 receives the scan signal and provides the data signal 120 including, or otherwise encoding, the value (or encoded information) of the machine-readable code 118.

The scanner circuitry 110 may include a scan complete indicator 130 that produces a flash of light, an audible "beep", or some other signal to a user that the scanning operation is done and successful. Furthermore, the code scanner 102 may optically detect the machine-readable code 118 within a scan field of view 132. Once the present operation is complete, a user moves the code scanner 102 out of contact with the object 108, such that the wheels 106(1) and 106(2) are no longer rotating.

The scanner circuitry 110 responds to the non-rotating condition of the wheels 106(1) and 106(2) by returning to an inactive state, reducing the electrical current drawn from the battery 112. In another instance, the scanner circuitry 110 automatically returns to the inactive state once a predefined time period has expired, after successful completion of the scanning operation. In still another instance, motion of the code scanner 102 is detected using one or more accelerometers of the scanner circuitry 110. Therein, the scanner circuitry 110 assumes the active state in response to a rotating condition of the wheels 106, but returns to the inactive state after the code scanner 102 has been still for some period of time as indicated by accelerometer signaling. Other state-changing or "power-down" procedures may also be used.

As described above, the code scanner 102 provides the data signal 120 to the computing device 122 during or as a conclusion to the scanning operation. In another implementation, the code scanner 102 may store the decoded machine-readable code 118 within machine-accessible storage media. The code scanner 102 may then be used for respective scanning operations over the course of, for example, a workday, and then download the respective decoded data thereafter. Other operative scenarios are also possible.

Figure 2:
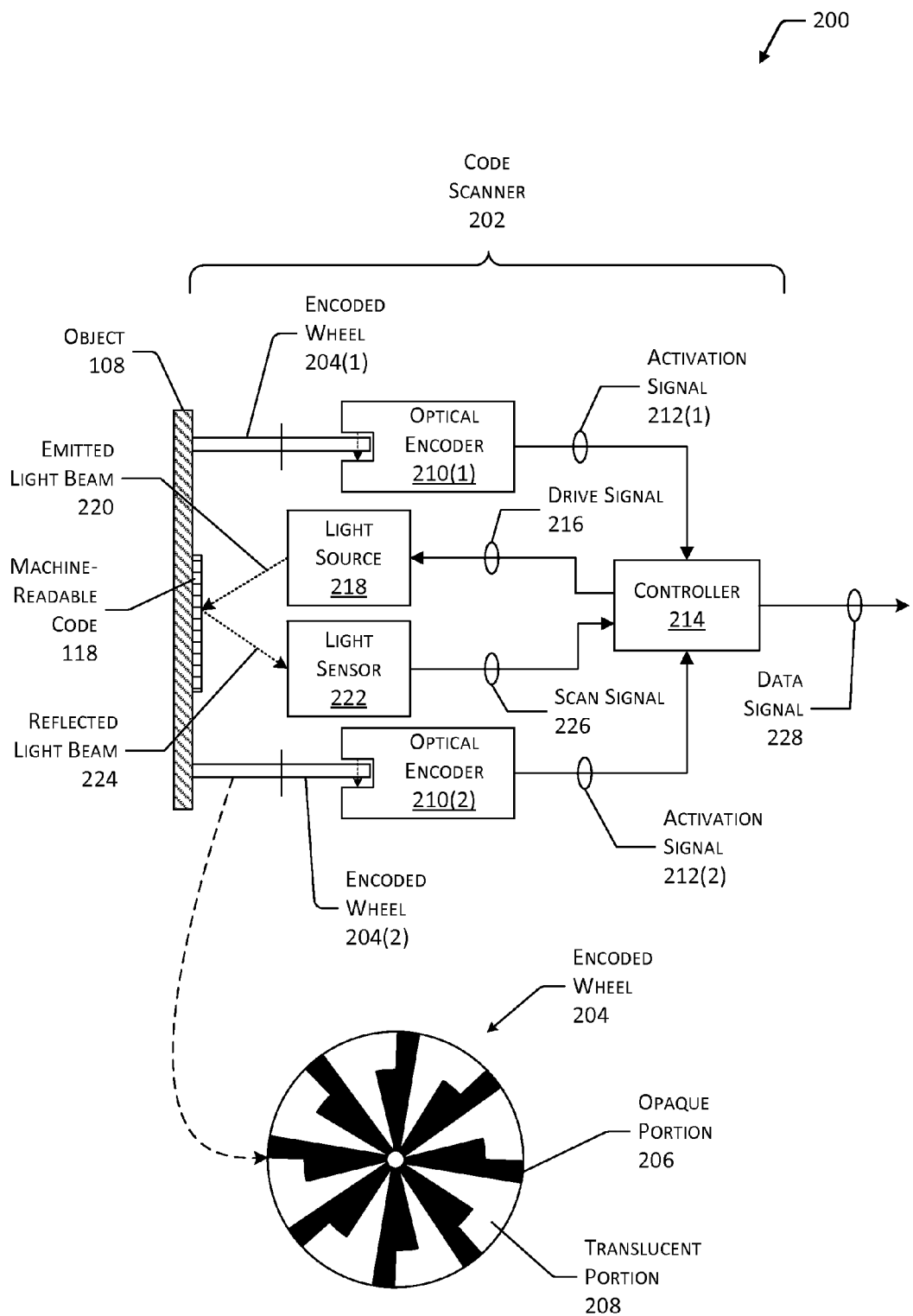
FIG. 2 illustrates a code scanner using encoded wheels and optical encoders to provide activation signals according to one implementation.

FIG. 2 depicts views 200 of a code scanner 202 according to one implementation. The code scanner 202 is illustrative and non-limiting in nature. In one implementation, the code scanner 202 may be equivalent or analogous to the code scanner 102. Other implementations and variations may also be used.

The code scanner 202 includes encoded wheels 204(1) and 204(2). The encoded wheels 204 include respective opaque portions 206 and respective translucent (or transparent) portions 208. In one implementation, the encoded wheels 204 may be formed using a translucent material such as plastic, to which a decal is applied to define the opaque portions 206. The encoded wheels 204 also include traction edge surfaces or texturing for non-slip rolling engagement with the object 108. In another implementation, each encoded wheel 204 may be opaque and includes a pattern having light reflecting portions and light absorbing portions, and reflected light is used to detect rotation of the encoded wheel 204.

Each encoded wheel 204 is configured to block a beam of light from passing through the opaque portions 206, and to pass the beam of light through the translucent portions 208, during rotation of the encoded wheel 204 in cooperation with an optical encoder 210. As depicted, the encoded wheel 204 has opaque portions 206 in accordance with a characteristic pattern. However, other respectively varying patterns or designs may also be used.

The code scanner 202 also includes an optical encoder 210(1) disposed in cooperation with the encoded wheel 204(1), and an optical encoder 210(2) disposed in cooperation with the encoded wheel 204(2). Each optical encoder 210 is configured to produce or emit a beam of light from a light source that is passed or blocked depending upon the instantaneous angular orientation of the associated encoded wheel 204. The light source may be a light-emitting diode (LED), an incandescent lamp, or another device. The passed or blocked state of the emitted light is detected with a light sensor, such as a photo transistor, a cadmium-sulfide (CdS) cell, or another device.

A particular optical encoder 210 therefore detects pulses or flashes of the emitted light when the associated encoded wheel 204 rotates. Pulses of detected light indicate a rotating encoded wheel 204, while detection of a steadily passed or blocked light indicates a non-rotating encoded wheel 204. The optical encoders 210 are further configured to provide activation signals 212, respectively, in accordance with the detected states (i.e., rotating or stationary) of the encoded wheels 204. The respective encoded wheel 204 and optical encoder 210 associations may be referred to as motion sensors for purposes herein.

The code scanner 202 includes a controller 214. The controller 214 may be defined by or include a processor, a microcontroller, an application-specific integrated circuit (ASIC), or any other suitable electronic constituency. The controller 214 is configured to receive the activation signals 212(1) and 212(2) and to assume an activated state in response to one or the other, or both. The controller 214 is also configured to provide or assert a drive signal 216 in response to assuming the activate state.

The code scanner 202 also includes a light source 218 configured to emit a light beam 220 in response to the drive signal 216. The light source 218 may include a laser diode, a light-emitting diode (LED), an incandescent lamp, or another suitable light emitting element. The emitted light beam 220 is directed toward the machine-readable code 118 borne by the object 108 during typical operation. The code scanner 202 also includes light sensor 222 configured to detect or sense a reflected light beam 224—that is, a portion of the light beam 220—reflected back from the surface of the machine-readable code 118. The light sensor 222 provides a scan signal 226 corresponding to the light-and-dark information communicated by the reflected light beam 224.

The controller 214 receives and processes the scan signal 226 so as to decode the value or information of the machine-readable code 118. In one non-limiting implementation, the scan signal 226 may be received at a general purpose input/output (GPIO) pin (or node) of the controller 214. Other signaling implementations may also be used. The controller 214 provides a data signal 228 that includes, or encodes, the machine-readable code 118. In one implementation, the data signal 228 is equivalent or analogous to the data signal 120. The controller 214 is further configured to inactivate the light source 218 or the light sensor 222 (or both) and resume an inactive, power-conserving state once a present scanning operation is complete.

Specifically, a user lifts the code scanner 202 out of contact with the object 108, and the encoded wheels 204 stop rotating, accordingly, resulting in cessation of the activation signals 212. The controller 214 may then signal the light source 218 to shut down, and the controller 214 assume the inactive condition. Other shutdown procedures may also be used.

In another implementation, wheels (e.g., 106, 204) are used each having an electrically conductive layer overlaid with an electrically insulating layer. A pattern of holes is defined in the insulating layer such that the conductive layer beneath is exposed at each hole. Electrically conductive fingers or extensions make contact with the conductive layer as a hole comes into cooperative alignment therewith. Thus, a make-and-break electrical switching arrangement is defined, which provides an activation signal (e.g., 212) in the form of electrical pulses when the corresponding wheel is rotating in contact with the object 108.

In yet another implementation, wheels are used that each have bumps or raised portions defined on one side. Alternatively, bumps or depressions may be defined on the wheels edge in a cam-like manner. An electromechanical switch is disposed to make contact with the bumps or depressions, opening and closing repeatedly as the wheel rotates. Such an electrical switching arrangement also provides a pulse-type activation signal (e.g., 212) when the corresponding wheel is rotating in contact with the object 108. Still other implementations directed to using wheels and switching arrangements to generate an activation signal may also be used.

Figure 3:
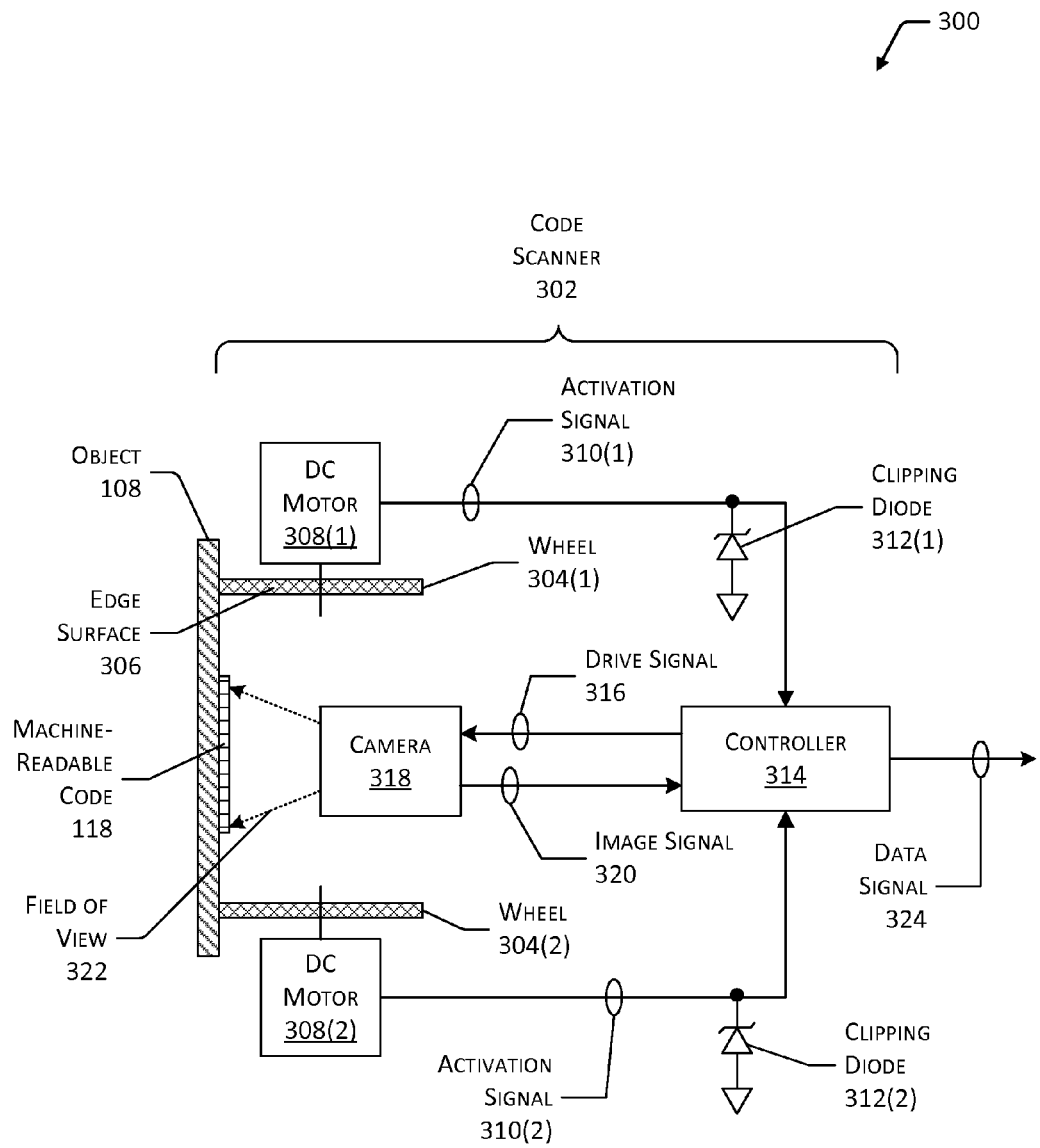
FIG. 3 illustrates a code scanner using wheels and direct current (DC) motors to provide activation signals according to one implementation.

FIG. 3 depicts views 300 of a code scanner 302 according to another implementation. The code scanner 302 is illustrative and non-limiting in nature. In one implementation, the code scanner 302 is equivalent or analogous to the code scanner 102. Other implementations and variations may also be used.

The code scanner 302 includes wheels 304(1) and 304(2). Each wheel 304 includes a friction or traction edge surface 306 so as to make non-slip, rotatable contact with the object 108 during scanning operations. Various and respective form-factors or materials may be used to form the wheels 304(1) and 304(2).

The code scanner 302 also includes a direct-current (DC) motor 308(1) that is configured and mechanically connected to be turned by rotation of the wheel 304(1). Similarly, the code scanner 302 includes a DC motor 308(2) configured to be turned by rotation of the wheel 304(2). The DC motors 308(1) and 308(2) are each configured to generate an electrical voltage when rotated, respectively defining activation signals 310(1) and 310(2). Thus, each DC motor 308—which is a form of a rotating electrical machine—functions as a DC electrical generating device or "dynamo" as implemented within the code scanner 302. Therefore, presence of a non-zero activation signal 310 is indicative of rotation of a corresponding wheel 304—that is, rolling contact with the surface of the object 108.

Each wheel 304 and DC motor 308 association, or cooperative pair, may be referred to as a motion sensor for purposes herein. Other forms of motors 308, generators, or other electrical elements or devices, either alternating-current (AC) or DC in nature, may also be used to generate the activation signals 310. Some such electrical elements may be respective forms of rotating electrical machines, linear electrical machines, and so forth.

As depicted, the code scanner 302 further includes respective clipping diodes 312(1) and 312(2). As depicted, each clipping diode 312 may be defined by or include a zener diode. However, silicon switching diodes, Schottky diodes, or other suitable semiconductor devices may also be used. The clipping diodes 312 are selected and configured to suitably limit the voltage range of the associated activation signals 310 by shunting excessive electrical potential to ground. In one non-limiting example, the clipping diodes 312 are selected to limit the activation signals 310 to within +3.3/−0.6 volts with respect to ground. Other suitable electrical parameters may also be used.

The code scanner 302 includes a controller 314. The controller 314 may be defined by or include a processor, a micro-controller, an application-specific integrated circuit (ASIC), or any other suitable electronic circuitry. The controller 314 is configured to receive the (voltage limited) activation signals 310(1) and 310(2) and to assume an activated state in response to detected rotation of the wheel 304(1) or 304(2), or both. The controller 314 is also configured to provide or assert a drive signal 316 in response to the activated state triggered by the activation signal(s) 310.

The code scanner 302 also includes a camera 318 configured to be activated in response to the drive signal 316. The camera 318 is also configured to provide an image signal 320 corresponding to the appearance or content of images within a field of view 322. The image signal 320 communicates an image of the machine-readable code 118 during scanning operations. The image signal 320 may also be referred to as a scan signal for purposes herein.

The controller 314 receives the image signal 320 and uses it to decode the value of the machine-readable code 118. The controller 314 is configured to provide a data signal 324 that includes, or encodes, the machine-readable code 118. In one implementation, the data signal 324 is equivalent or analogous to the data signal 120. The controller 314 is further configured to inactivate the camera 318, and to resume an inactive, power-conserving state once a present scanning operation has been performed.

The code scanner 302 uses respective DC motors 308 to provide the activation signals 310, in turn causing other electronic resources to switch from an inactive state to an active state. Specifically, the DC motors 308 generate electrical energy in response to a rotating motor shaft. The DC motors 308 consume no electrical power during inactive or idle periods—that is, they exhibit zero quiescent current consumption. This contrasts with numerous other motion sensing techniques, such as the optical encoders 210 which require a continuous provision of electrical power in order to detect the turning of the associated encoded wheel 204.

In another implementation, one or more wheels (e.g., 304), or another rotatable element or elements, are supported proximate to a fingerprint reader on a portable computer or other device. A DC motor (e.g., 308) is configured to provide an electrical activation signal (e.g., 310) in response to a rotation of the wheel 304. Thus, a user may cause the DC motor 308 to signal for activation of the fingerprint reader or other elements of the device by causing the wheel 308 to rotate as they draw their fingertip across the reader. Other implementations using various rotatable devices or elements, or motion sensor configurations, to provide activation signals 310 may also be used.

Figure 4:
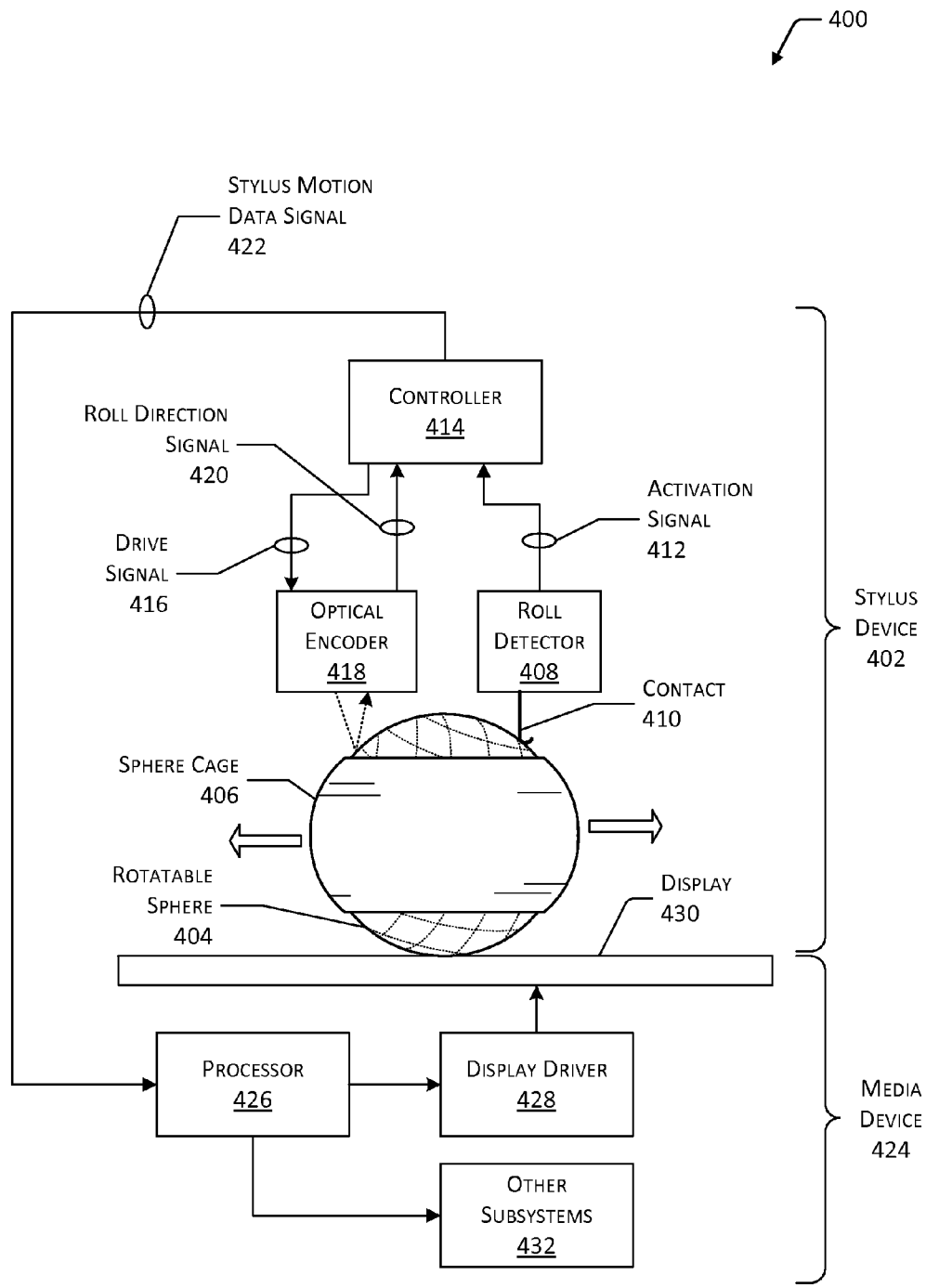
FIG. 4 illustrates a stylus device using a rolling sphere and roll detector to provide an activation signal according to another implementation.

FIG. 4 depicts views 400 including a stylus device 402 according to another illustration. The stylus device 402 is illustrative and non-limiting in nature. Other implementations and variations may also be used.

The stylus device 402 includes a rotatable (or roll-able) sphere 404. The rotatable sphere 404 may be made from any suitable material such as synthetic rubber or silicone compounds, metal, plastic, and so forth. The rotatable sphere 404 is constrained within a sphere cage 406 such that a lower portion of the rotatable sphere 404 is disposed to make rolling contact with a surface of an object. In one implementation, the rotatable sphere 404 is defined by a surface pattern that enables detection of a rolling motion of the rotatable sphere 404. In another implementation, the surface pattern of the rotatable sphere 404 increases friction in the interest of non-slip rolling contact with a surface.

In other respective implementations, other types of rotatable device such as wheels 106, encoded wheels 204, spheroids, and so forth may be used. The sphere cage 406 is a structure that permits the sphere 404 to rotate or roll, while retaining the sphere 404 in fixed location relative to the rest of the stylus 402. That is, the sphere 404 is not translated relative to the stylus 402 when the sphere 404 is in rolling contact with a surface of such an object. Other structures may also be used to rollably support the sphere 404, such as wire frameworks, spring-loaded contact pads, hemispherical shells or walls, and so on.

The stylus device 402 also includes a roll detector 408 including a contact 410. The contact 410 is configured to sense rolling motion of the rotatable sphere 404 by way of incidental vibrations. In one implementation, the contact 410 is mechanically coupled to a piezoelectric element that produces an electrical signal in response to sensed vibrations. Other sensing techniques may also be used. The roll detector 408 is configured to provide an activation signal 412 in response to rolling of the rotatable sphere 404 as sensed by the contact 410. The rotatable sphere 404 and the roll detector 408 association may be referred to as a motion sensor for purposes herein.

In another implementation, the rotatable sphere 404 includes a pattern of electrically conductive traces borne on the surface. One or more electrically conductive contacts 410 establish make-and-break contact with the trace pattern as the rotatable sphere 404 rolls across the surface of an object, thus producing a pulsed activation signal 412. In yet another implementation, the rotatable sphere 404 or the sphere cage 406, or both, are loaded or biased by way of a spring and may be displaced within a linear range of motion by way of an applied force. A user may bring the stylus device 402 into contact with an object so as to displace the rotatable sphere 404 against the spring, such that an electromechanical switch is actuated through contact with the rotatable sphere 404 and the activation signal 412 is provided accordingly. Other implementations using one or more rotatable spheres 404, or variations thereof, may also be used to provide an activation signal 412.

The stylus device 402 also includes a controller 414. The controller 414 may be defined by or include a processor, a microcontroller, and so forth. The controller 414 is configured to receive the activation signal 412, and to assume an activated state in response thereto. Thus, the controller 414 is activated by way of detected rolling of the rotatable sphere 404. The controller 414 is also configured to provide a drive signal 416 in response to the activation signal 412.

The stylus device 402 further includes an optical encoder 418. The optical encoder 418 is configured to be activated in response to the drive signal 416. The optical encoder 418 is also configured to determine a direction or orientation of rolling of the rotatable sphere 404 and to provide a corresponding roll direction signal 420. The roll direction signal 420 is provided to the controller 414. The controller 414 is also configured to provide a stylus motion data signal 422 that communicates, or encodes, a direction of motion of the stylus device 402 in accordance with a direction that the rotatable sphere 404 is rolling across a surface.

Also depicted is a media device 424. The media device 424 includes a processor 426 configured to operate according to a machine-executable code. The processor 426 receives the stylus motion data signal 422 and may be further configured to perform or cause respective operations accordingly, as illustrated below. The processor 426 is in communication with a display driver 428 of the media device 424. The display driver 428 is configured to present images, text, video content, indicia, and so forth on a display 430 of the media device 424, in accordance with data or control signaling received from the processor 426. The processor 426 may also communicate with, or send control signaling to, various other subsystems 432 of the media device 424, which are not germane to the present illustration.

In one illustrative and non-limiting operation, a user grasps the stylus device 402, which may be implemented having a pen or wand-like form-factor. The rotatable sphere 404 is brought into contact with the display 430, and rolled across the surface of the display 430 in accordance with user input. For example, a user may be running a photo editing application on the media device 424, and using the stylus device 402 to circumscribe a perimeter for cropping a digital photograph. Rolling movement of the rotatable sphere 404 results in the assertion of the activation signal 412, in turn resulting in an active state of the stylus device 402.

In the present example, the stylus motion data signal 422 corresponding to the movement of the stylus device 402 is provided to the processor 426, which provides signaling to the display driver 428. In turn, the display driver 428 causes a curvilinear line to appear on the display 430 in accordance with user movement of the stylus device 402. A closed perimeter is thus visibly defined about an area within a digital photograph, and a cropping operation may then proceed.

Continuing the present example, a user then sets the stylus device 402 aside so as to provide input by way of other devices of the media device 424. The controller 414 responds to a non-asserted condition or "null" value of the activation signal 412, and signals the optical encoder 418 to assume an inactive state. The controller 414 then assumes an inactive state, as well. The stylus device 402 is now in a reduced energy-consuming, inactive condition, conserving power drawn from an energy source such as the battery 112.

Figure 5:
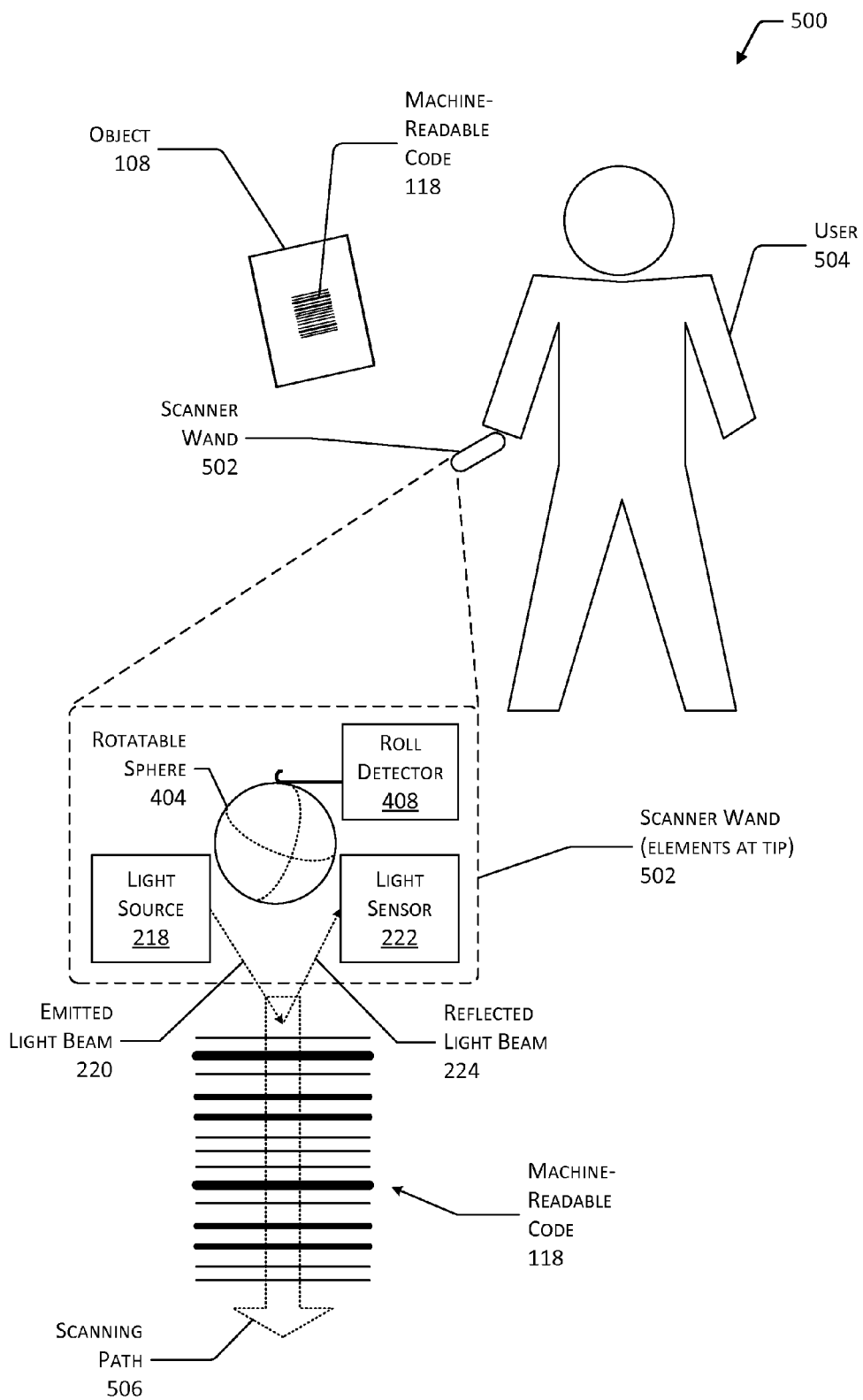
FIG. 5 illustrates a scanner wand using a rolling sphere and a roll detector to provide an activation signal according to one implementation.

FIG. 5 depicts views 500 including a code scanner 502 and related elements. The code scanner 502 is illustrative and non-limiting in nature. Other implementations and variations may also be used The code scanner 502 is associated with a user 504. In particular, the code scanner 502 has a housing and overall form-factor defining a handheld device. The code scanner 502 includes the rotatable sphere 404 and the roll detector 408 as respectively described above. Thus, the roll detector 408 is configured to provide or assert an activation signal 412 in response to a rolling motion of the rotatable sphere 404.

The code scanner 502 further includes the light source 218 and the light sensor 222 as respectively described above. The light source 218 is signaled into operation by the controller 214 in response to the activation signal 412, and emits a light beam 220. The reflected light beam 224 is received by the light sensor 222, which provides a corresponding scan signal 226 to the controller 214. The controller 214 is configured to process the scan signal 226 and provides a data signal 228 that includes or encodes the machine-readable code 118. For purposes of further illustration, the code scanner 502 may operate by way of electrical power provided by the battery 112.

In particular, the user 504 may bring the code scanner 502 into contact with the object 108 at or near to the printed machine-readable code 118 (e.g., a barcode) thereon. For example, the machine-readable code 118 may correspond to a stock keeping unit (SKU) code for an item of retail merchandise. The user 504 then moves the code scanner 502 such that the rotatable sphere 404 is in rolling contact with the object 108 along the scanning path 506. A controller 214, the light source 218, and the light sensor 222 of the code scanner 502 are activated in response to the rolling motion of the rotatable sphere 404, and a machine-readable code 118 scanning operation is performed accordingly.

Once the scanning operation is complete, the user 504 lifts the code scanner 502 out of contact with the object 108. Consequently, the rolling motion of the rotatable sphere 404 is brought to a halt. The controller 214 causes the code scanner 502 to resume an inactive state, reducing electrical current drawn from the battery 112 and conserving power.

Figure 6:
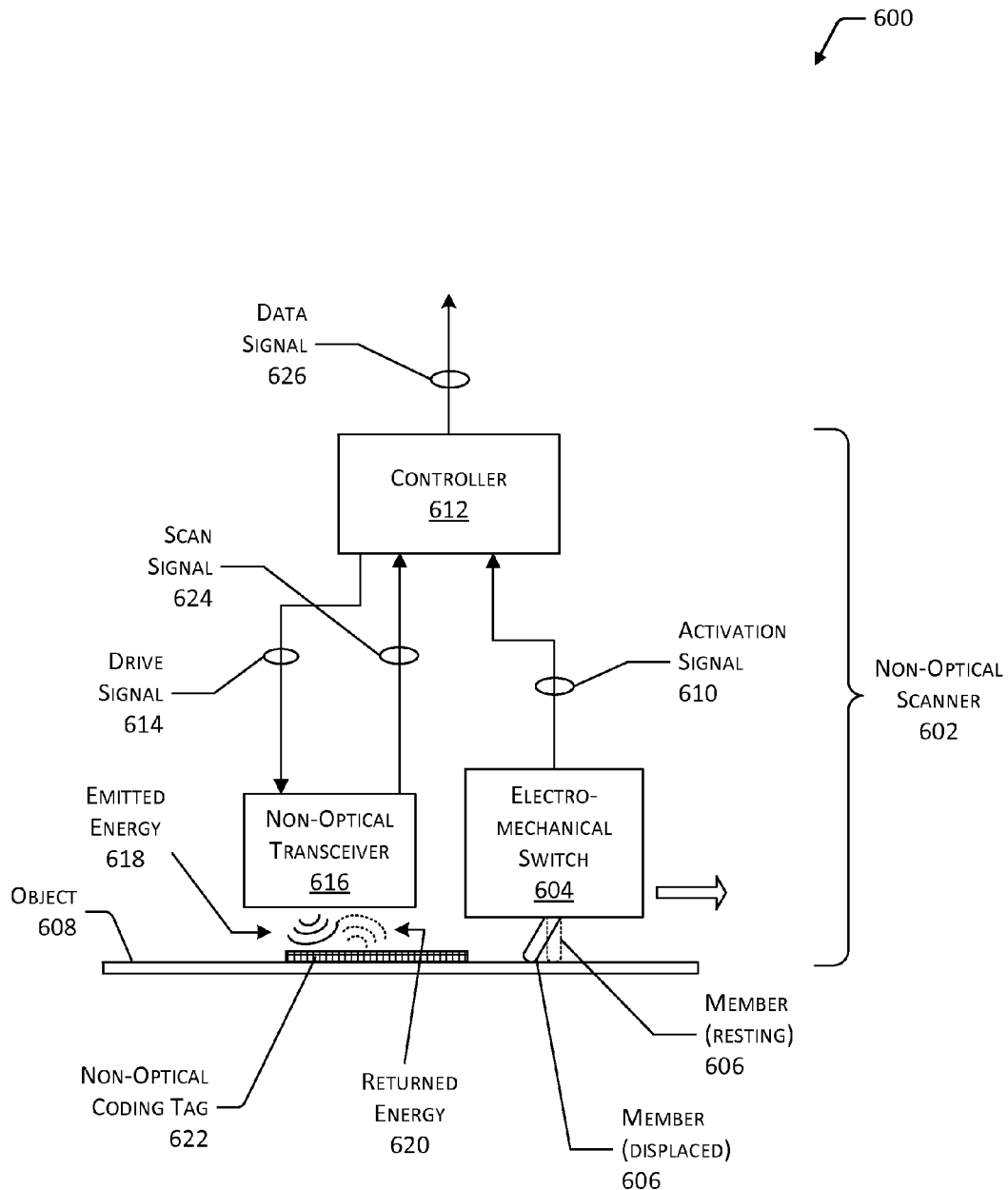
FIG. 6 illustrates a non-optical code scanner using an electromechanical switch to provide an activation signal according to still another implementation.

FIG. 6 depicts views 600 including a non-optical scanner 602, and related elements. The non-optical scanner 602 is illustrative and non-limiting in nature. Other implementations and variations may also be used.

The non-optical scanner 602 includes an electromechanical switch 604, which includes a member 606 that may defined by or include a lever, a slider, a cam, or another element or elements. The member 606 extends outward from the electromechanical switch 604 and is configured to be displaced from a resting position by moving (i.e., sliding) contact with an object 608. The electromechanical switch 604 is configured to provide an activation signal 610 in response to displacement of the member 606, thus indicating contacting motion of the non-optical scanner 602 relative to the object 608. The electromechanical switch 604 may also be referred to as a motion sensor for purposes herein.

The non-optical scanner 602 also includes a controller 612. The controller 612 may be defined by or include and ASIC, a microcontroller or other processor, or any other suitable constituency. The controller 612 is configured to receive the activation signals 610 and to assume an activated state accordingly. The controller 612 is also configured to provide or assert a drive signal 614 in response to the activated state.

The non-optical scanner 602 also includes a non-optical transceiver 616. The non-optical transceiver 616 is configured to switch from an inactive state to an active state in response to the drive signal 614. The non-optical transceiver 616 is also configured to provide a non-optical energy emission such as, without limitation, an RF field, acoustic waves, and so on. For purposes of a present illustration, the non-optical transceiver 616 is configured to provide RF emitted energy 618. The non-optical transceiver 616 is further configured to receive returned energy 620 that is modulated, pulsed, or otherwise affected by a non-optical coding tag 622.

In the present illustration, the non-optical coding tag 622 is an RFID tag or device configured to modulate the returned energy 620 so as to communicate a machine-readable code (i.e., 118). For example, the non-optical coding tag 622 may be configured to communicate an ordering code or model number for a particular industrial control instrument. Other types of non-optical coding tags 622 may be used in accordance with other types of emitted energy 618. Thus, the returned energy 620 conveys the ordering code for the particular object 608 being scanned.

The non-optical transceiver 616 is further configured to provide a scan signal 624 that communicates the information of the non-optical coding tag 622. The controller 612 receives the scan signal 624 and provides a data signal 626 that includes, or encodes, the machine-readable code 118 of the non-optical coding tag 622. The data signal 626 may be formatted for reception and use by the computing device 122. For example, the data signal 626 may be used to verify the ordering code of the object 608 against compatible ordering codes stored within a data structure, and so on.

Once scanning of the non-optical coding tag 622 is complete, and the data signal 626 has been provided, the non-optical scanner 602 is moved out of contact with the object 608. The member 606 returns to a resting position under spring biasing, and the activation signal 610 is no longer provided or asserted. The controller 612 signals the non-optical transceiver 616 to shut down by way of cessation of the drive signal 614, such that the emitted energy 618 is no longer provided. The controller 612 also assumes a shut down or inactive state, reducing overall electrical power draw by the non-optical scanner 602.

Figure 7:
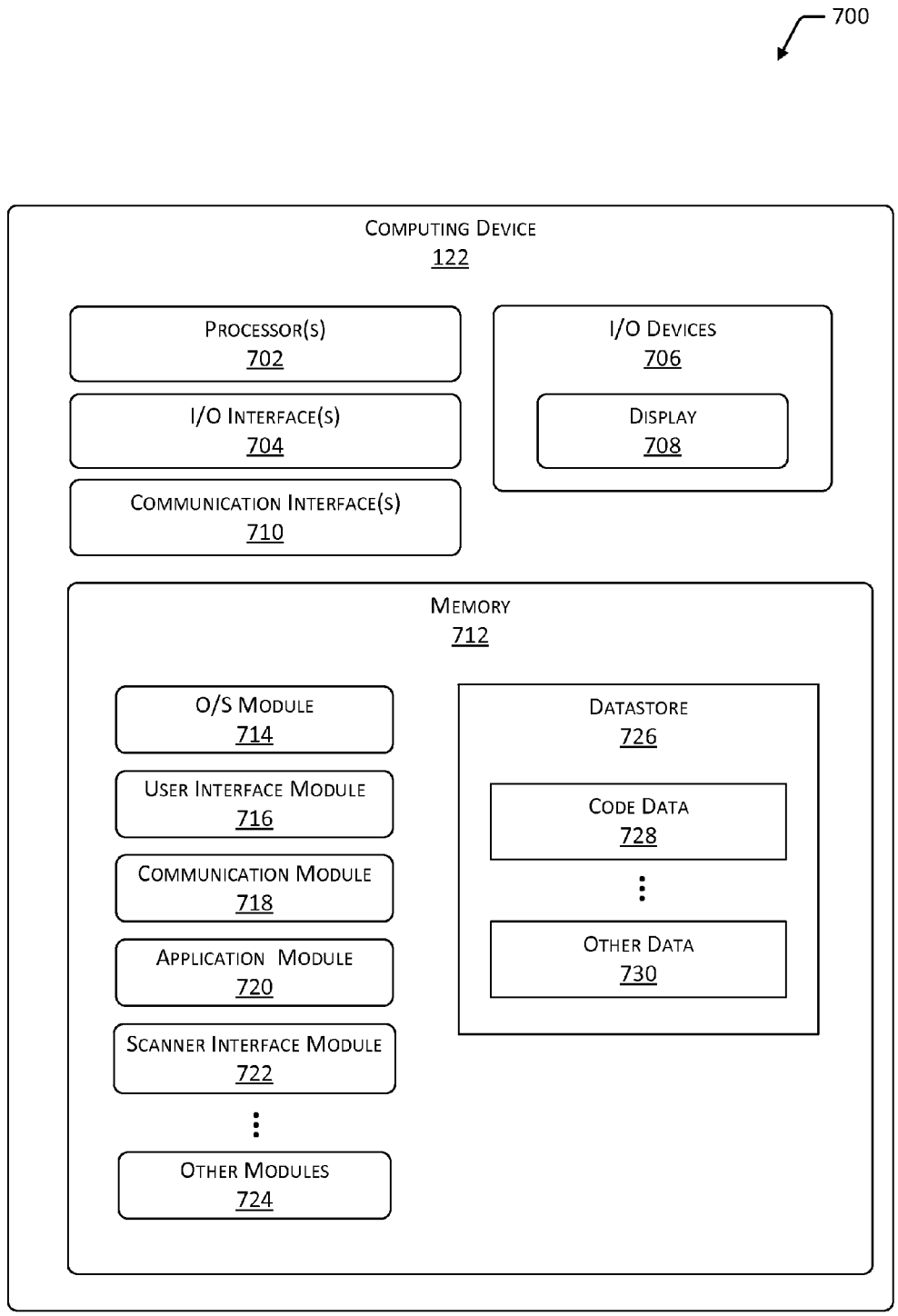
FIG. 7 is a block diagram depicting a computing device.

FIG. 7 illustrates a block diagram 700 of the computing device 122. In one instance, the computing device 122 may be a desktop computer, a web server, or other apparatus. The computing device 122 is illustrative and non-limiting, and other computing devices of analogous or respectively varying configuration or constituency may also be used. The computing device 122 may include one or more processors 702 configured to execute one or more stored instructions. The processor(s) 702 may comprise one or more cores.

The computing device 122 may include one or more I/O interface(s) 704 to allow the processor(s) 702 or other portions of the computing device 122 to communicate with the respective scanners 102-302 or 502-602, the stylus device 402, various user devices, other computing devices 122, and so on. The I/O interfaces 704 may comprise I2C, SPI, USB, RS-232, and so forth.

The I/O interface(s) 704 may couple to one or more I/O devices 706. The I/O devices 706 may include one or more input devices such as a keyboard, mouse, and so forth. The I/O devices 706 may also include output devices such as one or more of a display 708, audio speakers, haptic output devices, and so forth. In some embodiments, the I/O devices 706 may be physically incorporated with the computing device 122, or they may be externally placed.

The computing device 122 may also include one or more communication interfaces 710. The communication interfaces 710 are configured to provide communications between the computing device 122, the respective scanners 102-302 or 502-602, the stylus device 402, routers, access points, and so forth. The communication interfaces 710 may include wireless functions, devices configured to couple to one or more networks including PANs, LANs, WLANs, WANs, and so forth. The computing device 122 may also include one or more busses or other internal communications hardware or software that allow for the transfer of data between the various modules and components of the computing device 122.

The computing device 122 includes one or more memories 712. The memory 712 comprises one or more computer-readable storage media (CRSM). The memory 712 provides storage of computer readable instructions, data structures, program modules and other data for the operation of the computing device 122. The memory 712 may include at least one operating system (OS) module 714. Respective OS modules 714 are configured to manage hardware devices such as the I/O interfaces 704, the I/O devices 706, the communication interfaces 710, and provide various services to applications or modules executing on the processors 702.

Also stored in the memory 712 may be one or more of the following modules. These modules may be executed as foreground applications, background tasks, and so forth. A user interface module 716 may be configured to provide one or more application programming interfaces. The user interface module 716 may be configured to operate with information encoded as hypertext markup language ("HTML") files, extensible markup language ("XML") files, or in another suitable format or language. The user interface module 716 is configured to accept inputs and send outputs using the I/O interfaces 704, the communication interfaces 710, or both.

A communication module 718 is configured to support communication with the respective scanners 102-302 or 502-602, the stylus device 402, one or more other computing devices 122, and so forth using one or more networks or other communication pathways. In some implementations, the communication module 718 may support encrypted communications. For example, hypertext transport protocol secured ("HTTPS") or transport layer security ("TLS") may be supported.

The memory 712 may also include one or more application modules 720. The applications modules 720 may provide executable code such that various operations or functions may be performed by the computing device 122. Non-limiting examples of the applications modules 720 include a word processing application, a spreadsheet application, a technical drawing or illustrating application, a digital photograph viewing or editing application, and so on.

The memory 712 may further include a scanner interface module 722 configured to support communication with the respective scanners 102-302 or 502-602, enable the user 504 to reconfigure or select various operating options of the respective scanners 102-302 or 502-602, and so forth. Other modules 724 may also be present. For example, a wireless communications module may operate to receive data signals (120, 228, and so on) by way of wireless signaling.

The memory 712 may also include a datastore 726 to store information. The datastore 726 may use a flat file, database, linked list, tree, executable code, or other data structure to store the information. In some implementations, the datastore 726 or a portion of the datastore 726 may be distributed across one or more other computing devices 122 including servers, network attached storage devices and so forth.

The datastore 726 may store code data 728, which may include machine-readable codes (e.g., 118), information, or other data as received by way of the respective data signals 120, 228, 324, or 626, and so forth. The datastore 726 may also store one or more data structures against which respective ones of the code data 728 are cross-referenced or validated. The datastore 726 may also store other data 730. For example, the other data 730 may include parameter settings for download into and configuration of individuals of the respective scanners 102-302 or 502-602. The other data 730 may also include one or more data structures that may be queried, modified, amended, and so forth.

Figure 8:
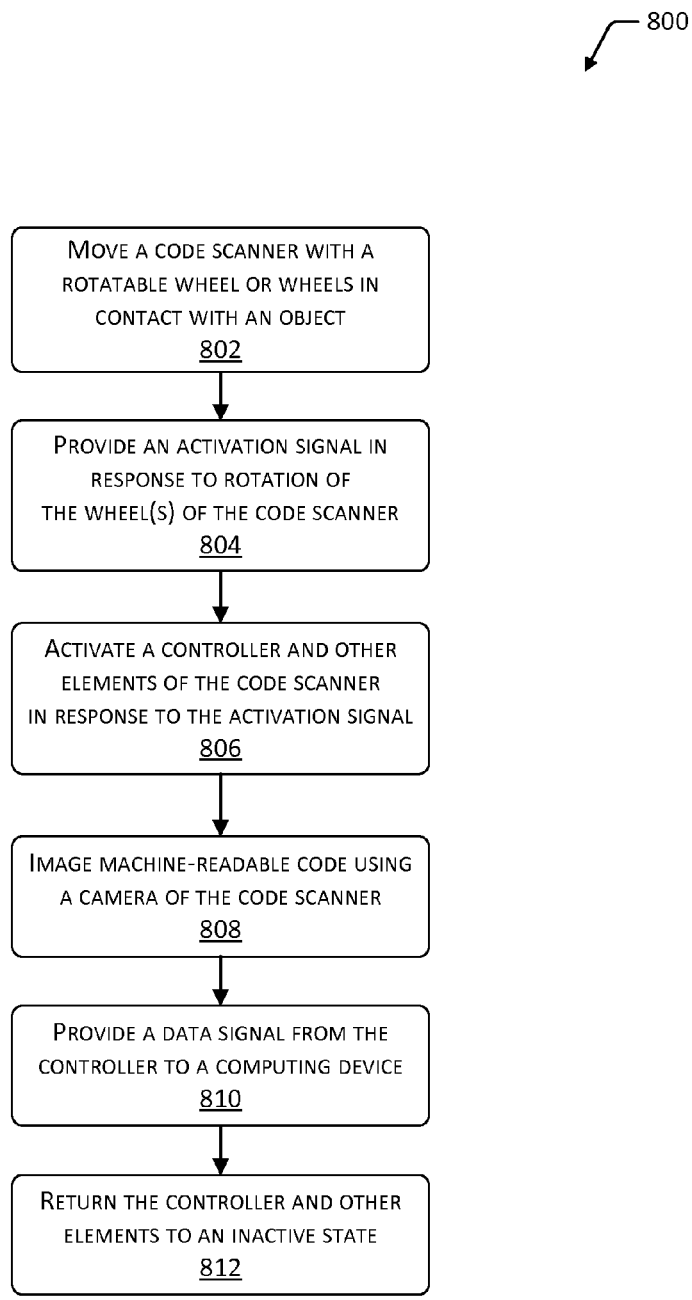
FIG. 8 is a flow diagram of an illustrative process of scanning a machine-readable code.

FIG. 8 is a flow diagram 800 illustrating a process including scanning of a machine-readable code, and activation and deactivation of a code scanner. In one non-limiting example, this process may be implemented by way of the code scanner 302 and the computing device 122. The process of the flow diagram 800 is illustrative and non-limiting, and other processes including one or more other steps, omitting one or more of the depicted steps, or proceeding in other orders of execution, may also be used.

Block 802 moves a code scanner 302 with a rotatable wheel or wheels 304 in contact with an object 108. For purposes of a present example, the user 504 manually grasps the code scanner 302 and brings the wheels 304(1) and 304(2) into contact with a surface of the object 108, proximate to a machine-readable code 118. In the present example, the machine-readable code 118 includes a SKU barcode printed in ink on the object 108. The user 504 then moves the code scanner 302 such that the wheels 304(1) and 304(2) roll along the surface of the object 108.

Block 804 provides an activation signal 310 in response to rotation of the wheel(s) 304 of the code scanner 302. In the present example, the rolling wheels 304(1) and 304(2) cause the DC motors 308(1) and 308(2), respectively, to generate electrical voltages, defining activation signals 310(1) and 310(2). The activation signals 310(1) and 310(2) are voltage-limited by the respective clipping diodes 312(1) and 312(2), accordingly.

Block 806 activates a controller 314 and other elements of the code scanner 302 in response to the activation signal 310. In the present example, the controller 314 switches (or transitions) from an inactive state to an active state in response to the respect activation signals 310. The controller 314 also provides a drive signal 316 to a camera 318 of the code scanner 302 causing it to assume an active state, as well.

Block 808 images a machine-readable code 118 using the camera 318 of the code scanner 302. In the present example, the camera 318 captures an image (i.e., digital photograph) of the machine-readable code 118 as the code scanner 302 is passed there over. The camera 318 provides an image signal 320 including the captured image to the controller 314. Thus, an image of the SKU code provided by the machine-readable code 118 is communicated to the controller 314.

Block 810 provides a data signal 324 from the controller 314 to a computing device 122. In the present example, the controller 314 processes the image signal 320 so as to construct digital data encoding the SKU code of the machine-readable code 118. The controller 314 then provides a data signal 324 encoding the SKU code to the computing device 122. The computing device 122 may now use the data signal 324 during inventory control, a point-of-sale function, or other operation.

Block 812 returns the controller 314 and other elements to an inactive state. In the present example, the user 504 moves the code scanner 302 out of contact with the object 108, resulting in a stationary condition of the wheels 304(1)-304(2). In turn, the DC motors 308(1)-308(2) stop generating the activation signals 310(1)-310(2). The controller 314 then discontinues the drive signal 316, causing the camera 318 to return to an inactive, low-power state. The controller 314 then resumes the inactive state from which it started at block 806 above. The code scanner 302 is now inactive, with reduced electrical power consumption (if any) from a source such as the battery 112.

Figure 9:
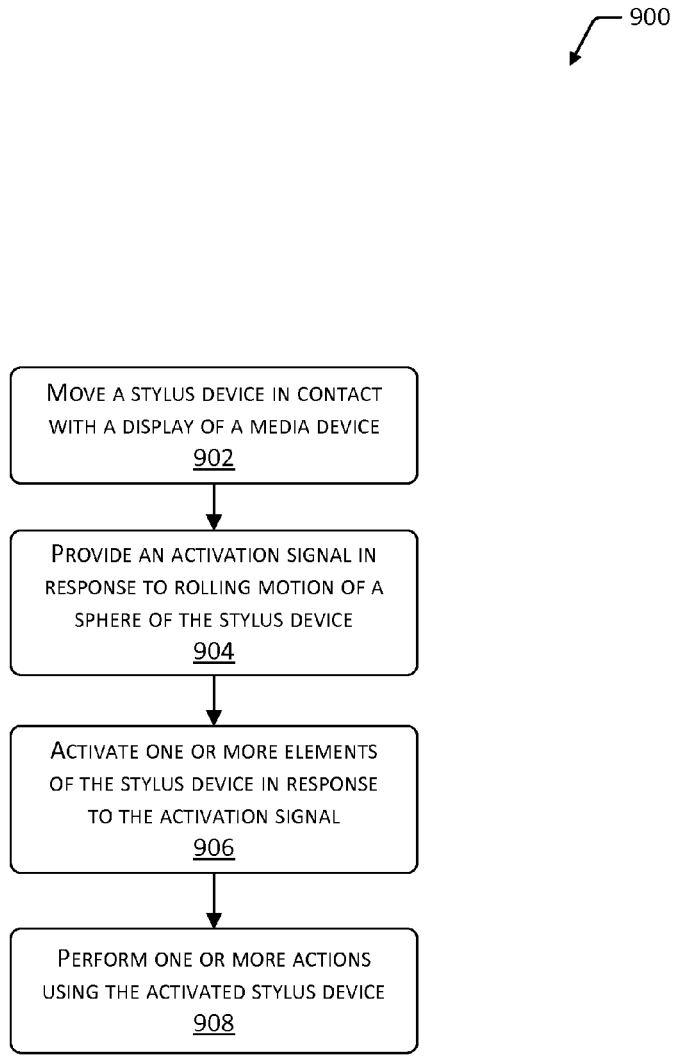
FIG. 9 is a flow diagram of an illustrative process of using a stylus device.

FIG. 9 is a flow diagram 900 illustrating a process including the use of a stylus device, and switching of the stylus device between inactive and active states. In some implementations, this process may be implemented by way of the stylus device 402 and the media device 424. The process of the flow diagram 900 is illustrative and non-limiting, and other processes including one or more other steps, omitting one or more of the depicted steps, or proceeding in other orders of execution, may also be used.

Block 902 moves a stylus device 402 in contact with a display 430 of a media device 424. For purposes of a present example, the user 504 holds the stylus device 402 in a pen-like orientation and moves the tip in contact with the display 430 of the media device 424.

Block 904 provides an activation signal 412 in response to a rolling motion of a rotatable sphere 404 of the stylus device 402. In the present example, the contact 410 provides a sensing signal to an associated roll detector 408 in response to the rolling motion of the rotatable sphere 404. The roll detector 408 responds to the detection by providing (or asserting) an activation signal 412. In one implementation, the roll detector 408 may include a miniaturized coil-and-magnet assembly that generates a low-voltage electrical signal (e.g., millivolts) in response to vibrations communicated by the contact 410. The roll detector 408 may then amplify the low-voltage electrical signal, thus deriving the activation signal 412. Other implementations may also be used.

Block 906 activates one or more elements of the stylus device 402 in response to the activation signal 412. In the present example, the activation signal 412 is provided to a controller 414, which responds by switching from an inactive, lower-power state to an active, higher-power state. The controller 414 also provides a drive signal 416 to an optical encoder 418 of the stylus device 402. The optical encoder 418 responds to the drive signal 416 by assuming an activated state, and provides a roll direction signal 420 to the controller 414. The roll direction signal 420 corresponds to a direction that the rotatable sphere 404 is rolling as it traverses the surface of the display 430.

Block 908 performs one or more actions using the activated stylus device 402. In the present example, the controller 414 may respond to the roll direction signal 420 by providing a stylus motion data signal 422 to a processor 426 of a media device 424. The processor 426 may then causes lines, selection acknowledgment indications, or other images to appear on the display 430 corresponding to the user 504 motion of the stylus device 402. Once an operation or operations using the stylus device 402 are complete, the stylus device 402 is set aside by user 504 and the rotatable sphere 404 is no longer in rolling motion. In turn, the controller 414 and the optical encoder 418 resume an inactive, lower-energy state so as to conserve electrical power.

Figure 10:
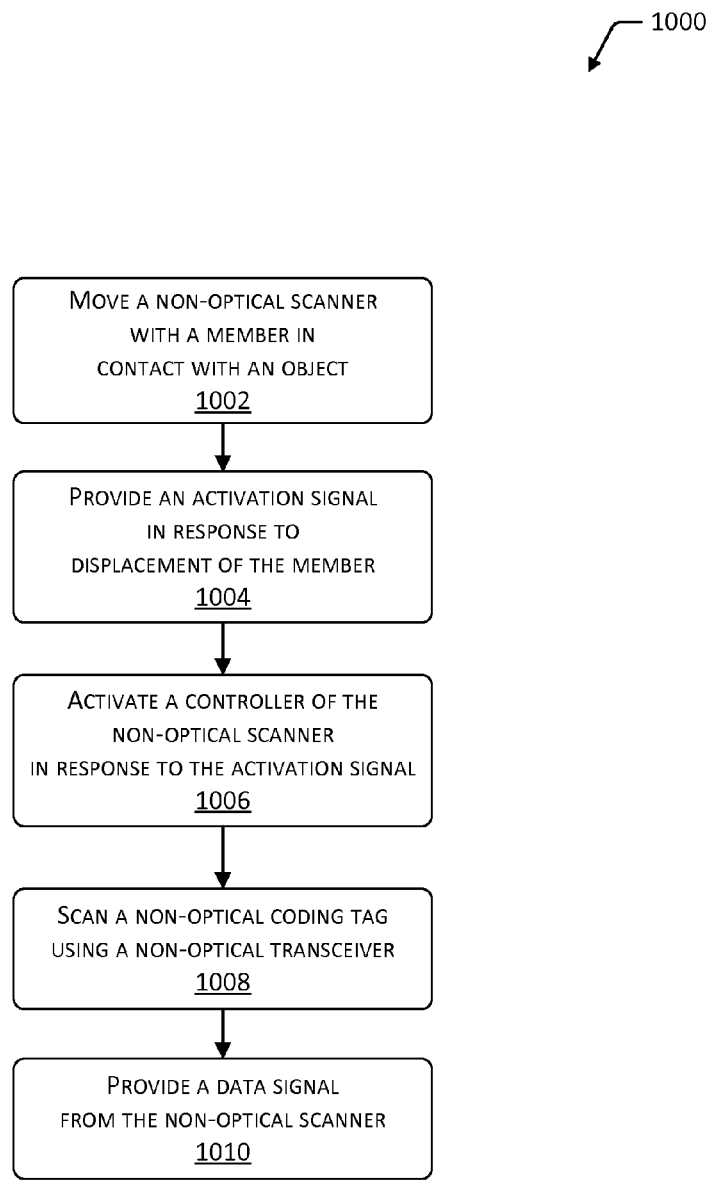
FIG. 10 is a flow diagram of an illustrative process of scanning a non-optical coding tag.

FIG. 10 is a flow diagram 1000 illustrating a process including the use of a non-optical scanner. In some implementations, this process may be implemented by way of the non-optical scanner 602. The process of the flow diagram 1000 is illustrative and non-limiting, and other processes including one or more other steps, omitting one or more of the depicted steps, or proceeding in other orders of execution, may also be used.

Block 1002 moves a non-optical scanner 602 with a member 606 in contact with an object 608. For purposes of a present example, the user 504 manually grasps the non-optical scanner 602, bringing the member 606 into displaced sliding contact with the object 608. The user 504 then moves the non-optical scanner 602 proximate to a non-optical coding tag 622 borne by the object 608. For instance, the object 608 may be an article of clothing for sale in a retail environment, bearing an RFID coding tag 622.

Block 1004 provides an activation signal 610 in response to displacement of the member 606. In the present example, the electromechanical switch 604 of the non-optical scanner 602 responds to the displaced state of the member 606 by providing an activation signal 610. Thus, the activation signal 610 indicates contacting motion of the non-optical scanner 602 with the object 608.

Block 1006 activates the controller 612 and other elements of the non-optical scanner 602 in response to the activation signal 610. In the present example, the controller 612 switches, or transitions, from an inactive state to an active state in response to the activation signal 610. In turn, the controller 612 provides a drive signal 614 to a non-optical transceiver 616, which responds by switching from an inactive state to an active state.

Block 1008 scans the non-optical coding tag 622 using the non-optical transceiver 616. In the present example, the non-optical transceiver 616 provides radio-frequency emitted energy 618 to illuminate, or activate, the non-optical coding tag 622. The non-optical coding tag 622 provides returned energy 620 that has been modulated so as to convey machine-readable information (e.g., 118). For instance, the non-optical coding tag 622 may selectively resonate under the influence of the emitted energy 618 such that the returned energy 620 is an RF backscatter signal digitally encoding a SKU number for the object 608. The non-optical transceiver 616 detects the returned energy 620 and provides a corresponding scan signal 624 to the controller 612, including the machine-readable information of the non-optical coding tag 622.

Block 1010 provides a data signal 626 from the non-optical scanner 602. In the present example, the controller 612 processes the scan signal 624 and derives a digitally encoded value representing, or including, the machine-readable code 118 or information acquired from the non-optical coding tag 622.

Now that the scanning operation is complete, the user 504 lifts the non-optical scanner 602 out of contact with the object 608, and the member 606 returns to a resting orientation. In turn, the activation signal 610 is no longer provided or asserted, and the controller 612 responds by ceasing the drive signal 614. The controller 612 and the non-optical transceiver 616 both resume an inactive state, ceasing the emitted energy 618 and conserving electrical power until the next scanning event.

Those having ordinary skill in the art will readily recognize that certain components, steps, or operations illustrated in the figures above can be eliminated, taken in an alternate order, or otherwise rearranged. Moreover, the methods described above may be implemented as one or more software programs for a computer system and are encoded in a computer-readable storage medium as instructions executable on one or more processors.

The computer-readable storage medium (CRSM) can be any one of an electronic storage medium, a magnetic storage medium, an optical storage medium, a quantum storage medium and so forth. Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments and situations.

Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A code scanner, comprising:
    a wheel configured to rotate in response to a motion of the code scanner relative to an object in mechanical contact with the wheel;
    an optical detector configured to provide a signal corresponding to an optical machine-readable code, wherein the optical detector includes either a camera, or a light source and a light sensor;
    a motion sensor configured to provide an activation signal in response to a rotation of the wheel; and
    electronic circuitry configured to:
        transition from a low power state to a high power state in response to the activation signal, the low power state consuming less electrical energy than the high power state during operation;
        provide a data signal including information corresponding to the optical machine-readable code during operation in the high power state, wherein the data signal is based on the signal provided by the optical detector, and wherein the optical machine-readable code is borne by the object; and
        communicate the data signal to a device external to the code scanner.

2. The code scanner of claim 1, wherein:
    the motion sensor includes a motor mechanically coupled to the wheel, the motor configured to generate the activation signal in response to a rotation of the wheel.

3. The code scanner of claim 1, wherein:
- the wheel includes an optically encoded pattern, the optically encoded pattern having light-passing portions and light-blocking portions; and
- the motion sensor includes a light source and a light sensor, the motion sensor configured to provide the activation signal in response to detecting rotation of the wheel using the light source and the light sensor.

4. The code scanner of claim 1, wherein:
- the wheel includes an optically encoded pattern, the optically encoded pattern having light-reflecting portions and light-absorbing portions; and
- the motion sensor includes a light source and a light sensor, the motion sensor configured to provide the activation signal in response to detecting rotation of the wheel using the light source and the light sensor.

5. An apparatus, comprising:
- a motion sensor configured to provide an activation signal in response to the apparatus and an object moving relative to each other, wherein one or more elements of the motion sensor are in contact with the object and rotated during the moving; and
- circuitry configured to switch from a first state to a second state in response to the activation signal, wherein the circuitry includes a controller configured to cause the apparatus to scan a machine-readable code during operation in the second state, wherein the machine-readable code is borne by the object, and wherein the circuitry is configured to consume less electrical power in the first state than in the second state.

6. The apparatus of claim 5, wherein the motion sensor includes:
- a wheel configured to be turned about an axis in response to rolling contact with the object; and
- an electrical generator configured to generate an electrical voltage in response to a turning of the wheel, the activation signal including the electrical voltage.

7. The apparatus of claim 5, wherein the motion sensor includes:
- an encoded wheel configured to be turned about an axis in response to rolling contact with the object;
- an optical sensor configured to provide the activation signal in response to optically detecting a turning of the encoded wheel.

8. The apparatus of claim 5, wherein the motion sensor includes:
- a sphere configured to roll in response to rolling contact with the object;
- a structure configured to retain the sphere with respect to the apparatus while allowing a rolling motion of the sphere;
- a detector configured to provide the activation signal by detecting the rolling motion of the sphere within the structure.

9. The apparatus of claim 8, wherein the detector includes a contact in physical contact with the sphere.

10. The apparatus of claim 5, wherein the circuitry further includes:
- a light source configured to emit light in response to a signal provided by the controller; and
- a light sensor configured to provide a scan signal in response to detecting a portion of the emitted light reflected from the machine-readable code borne by the object, wherein the scan signal is provided to the controller, and wherein the controller is further configured to communicate information corresponding to the machine-readable code using a data signal.

11. The apparatus of claim 5, further comprising a camera in communication with the circuitry, the camera configured to provide an image of the machine-readable code borne by the object, wherein the image is provided to the controller, and wherein the controller is further configured to communicate information corresponding to the machine-readable code using a data signal.

12. The apparatus of claim 5, wherein the circuitry is further configured to scan the machine-readable code borne by the object using non-optical energy emitted by the circuitry, and wherein the non-optical energy is either electromagnetic energy or acoustic energy, and wherein the controller is further configured to communicate information corresponding to the machine-readable code using a data signal.

13. The apparatus of claim 12, wherein the circuitry is further configured to process a radio-frequency backscatter signal received from the machine-readable code borne by the object.

14. The apparatus of claim 5, wherein the motion sensor includes an electromechanical switch having a body and a slider, the slider extending away from the body and in contact with at least a portion of the object, the electromechanical switch configured to provide the activation signal in response to displacement of the slider due to movement between the object and the motion sensor.

15. The apparatus of claim 5, wherein the circuitry is further configured to provide a data signal based on the machine-readable code scanned by the apparatus.

16. The apparatus of claim 5, further comprising a housing, wherein one or more elements of the motion sensor extend outward from the housing so as to make physical contact with the object.

17. A method performed at least in part by an apparatus, the method comprising:
- moving an object and a motion sensor relative to each other, wherein the object is in physical contact with at least one rotatable element of the motion sensor during the moving, the apparatus including the motion sensor;
- providing an activation signal from the motion sensor in response to the moving;
- transitioning one or more electronic elements of the apparatus from a first state to a second state in response to the activation signal; and
- performing one or more operations relative to the object using ones of the electronic elements, the electronic elements consuming less electrical power in the first state than in the second state.

18. The method of claim 17, wherein the one or more operations include:
- reading a machine-readable code borne by the object using ones of the electronic elements; and
- providing, using ones of the electronic elements, a data signal to a device external to the apparatus, wherein the data signal includes information corresponding the machine-readable code.

19. The method of claim 17, wherein the one or more operations include:
- rolling a sphere by way of contact with the object during the moving;
- detecting the rolling of the sphere using ones of the electronic elements; and
- providing a motion data signal from ones of the electronic elements in response to the detecting the rolling, wherein the motion data signal is provided to a device external to the apparatus, and wherein the motion data signal includes information corresponding to the moving.

20. The method of claim 17, further comprising transitioning ones of the electronic elements from the second state back to the first state after the performing the one or more operations.

* * * * *